Figure 1:
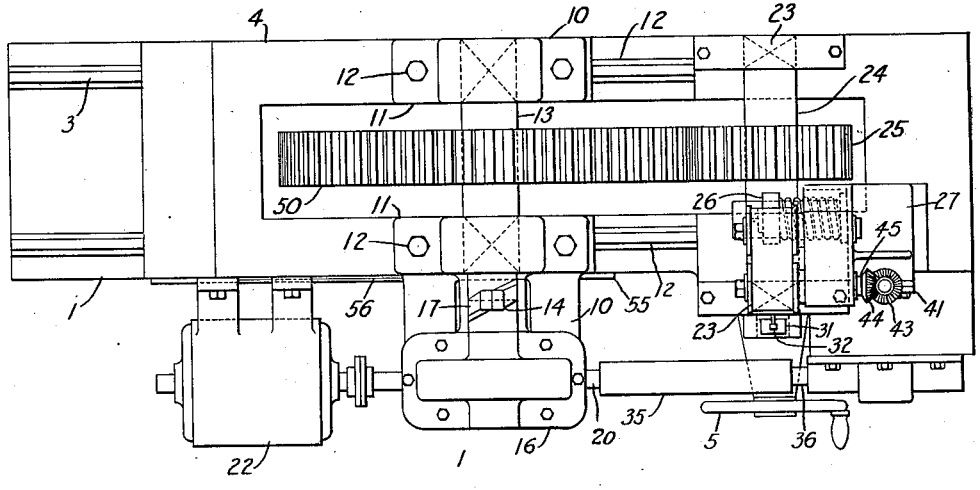
Figure 4A:
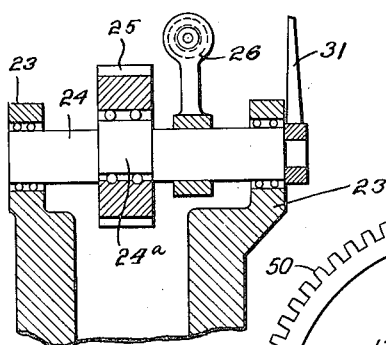

Feb. 12, 1924.

G. M. EATON 1,483,419

GEAR INSPECTION MACHINE

Filed Jan. 16, 1920　　2 Sheets-Sheet 1

WITNESSES:

INVENTOR
George M. Eaton
BY
ATTORNEY

Feb. 12, 1924.  
G. M. EATON  
GEAR INSPECTION MACHINE  
Filed Jan. 16, 1920

1,483,419

2 Sheets-Sheet 2

WITNESSES:

INVENTOR  
George M. Eaton  
BY  
ATTORNEY

Patented Feb. 12, 1924.

1,483,419

UNITED STATES PATENT OFFICE.

GEORGE M. EATON, OF PITTSBURGH, PENNSYLVANIA, ASSIGNOR TO WESTINGHOUSE ELECTRIC & MANUFACTURING COMPANY, A CORPORATION OF PENNSYLVANIA.

GEAR-INSPECTION MACHINE.

Application filed January 16, 1920. Serial No. 351,829.

*To all whom it may concern:*

Be it known that I, GEORGE M. EATON, a citizen of the United States, and a resident of Pittsburgh, in the county of Allegheny and State of Pennsylvania, have invented a new and useful Improvement in Gear-Inspection Machines, of which the following is a specification.

My invention relates to gear wheels and particularly to machines for testing gear wheels and it has for its object to provide a device for testing gear wheels to determine the variations from a standard and to make a permanent enlarged record of such variations. Various other objects will be apparent from the description or will be referred to hereinafter.

Inaccuracies in gear wheels may be due to two general causes. First, those due to errors in machining and, second, those due to the heat treatment to which the gear wheels are subjected. A gear-wheel blank, as received from the foundry or the forge shop, is provided with a central opening for the shaft with which it is to be operatively associated in operation. The blank may then be mounted on a mandrel and finished to specified dimensions. The teeth may be cut by any one of several methods, one of such methods being practiced by the use of a rotating hob. Incorrect setting or adjustment of the mandrel may result in a pitch circle which is eccentric to the axis of the shaft opening in the gear wheel. Improper operation of the tooth-cutting means may result in individual teeth being cut too deep or too shallow, or in individual teeth being too thick or too thin. As the gear wheel may be heat-treated after the teeth have been cut, the radius of the pitch circle may not be the same over the entire periphery, especially where the gear wheel has radial arms connecting the hub and the rim. As the gear wheels may be lowered into a quenching bath with the axis vertical, the lower edge of the gear wheel face may contract at a different rate from the upper edge, thus producing a spur gear wheel the contour of which is slightly frusto-conical instead of being a true cylinder.

Any one of the above-mentioned irregularities may cause trouble when the gear wheel is placed in operation, such as noise and increased or uneven wear.

Relatively few records are available, at the present time, not only of the actual variations from a standard in the completed gear wheels, but also of the maximum variations from a standard which may be allowed and still obtain good commercial operation. Such tests as have heretofore been made have generally consisted in operating the gear wheel to be tested in mesh with a complementary gear wheel or pinion and noting the degree of smoothness and quietness of operation. The result of a test of the character just mentioned depends upon the keenness of perception of the tester to sounds and this keenness of perception may vary from time to time. No definite standard of noise of operation can be given which will apply to the entire range of gear-wheel sizes, speeds and tooth pitches. No two men have the same judgment as to the permissible amount of noise, and the standard of one man may vary from time to time.

A special micrometer gauge may be so mounted as to be applied successively to a certain point on the side or flank of each tooth and the similarity of the readings obtained will be a measure of the correctness of the form and location of the teeth. Another method of testing small gear wheels is to mount them on test shafts in operative relation, rotate them by hand, and note the ease of operation and whether or not there is any tendency for the two gear wheels to bind at any point or points. In such a test, however, an error in the mounting of the gear wheels may indicate an error in the machining which may really be non-existent and, in all of these tests, two errors may counteract and substantially compensate for each other, thus permitting an incorrectly machined gear wheel to be placed in operation. Further, in all of these tests, no individual record of the test of each gear wheel is made or filed and hence it is impossible to check the performance of any gear wheel against the shop test thereof. Hence, it is one of the objects of my invention to provide a device which will permit an easily translatable record to be made of the deviations or variations of gear wheels from a standard, which record may be filed for future reference.

More specifically, my invention embodies a highly accurate master pinion which is rotatable on a pivotal mounting, the pivotal mounting being resiliently restrained from rotative movements. A rotatable shaft is provided on which the gear wheel to be tested may be mounted, the shaft and gear wheel being then so arranged as to bring the gear wheel into tight mesh with the master pinion and to effect a predetermined pressure between the engaging portions of the gear wheel and the pinion. A record sheet is provided which is moved in accordance with the angular movements of the gear wheel to be tested. A tracing device is secured to the pivotal mounting of the master pinion and co-operates with the record sheet to make a permanent enlarged record of the variations in the distance between the centers of the gear wheel and the master pinion due to variations of the gear wheel from a standard, as the gear wheel is rotated.

Figure 2:
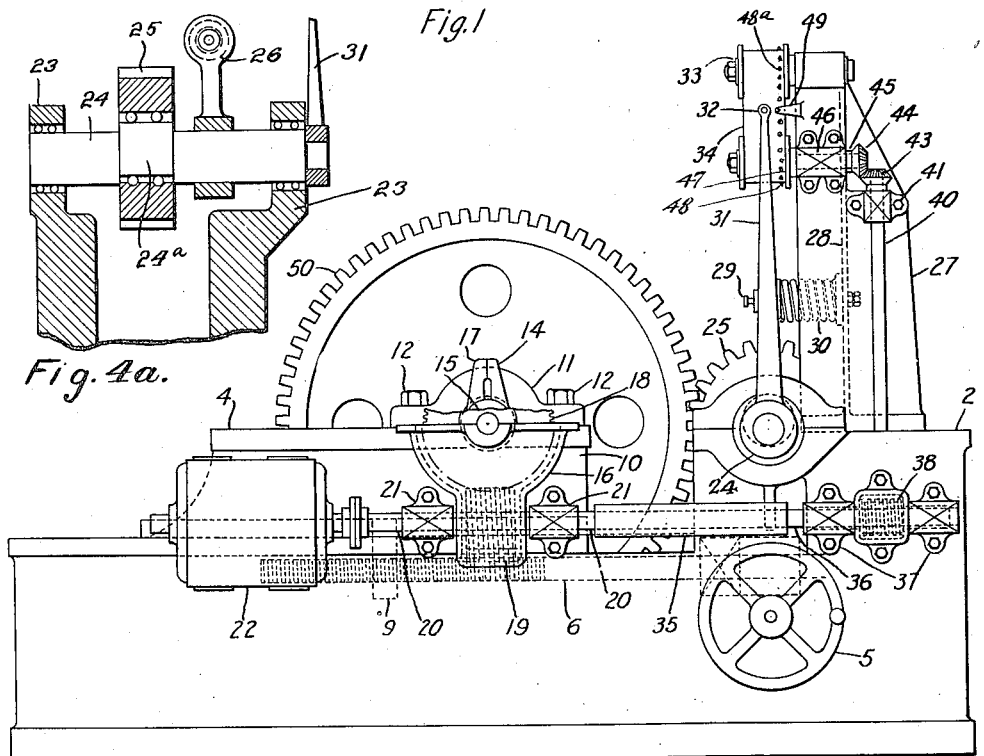
Figures 3, 4:
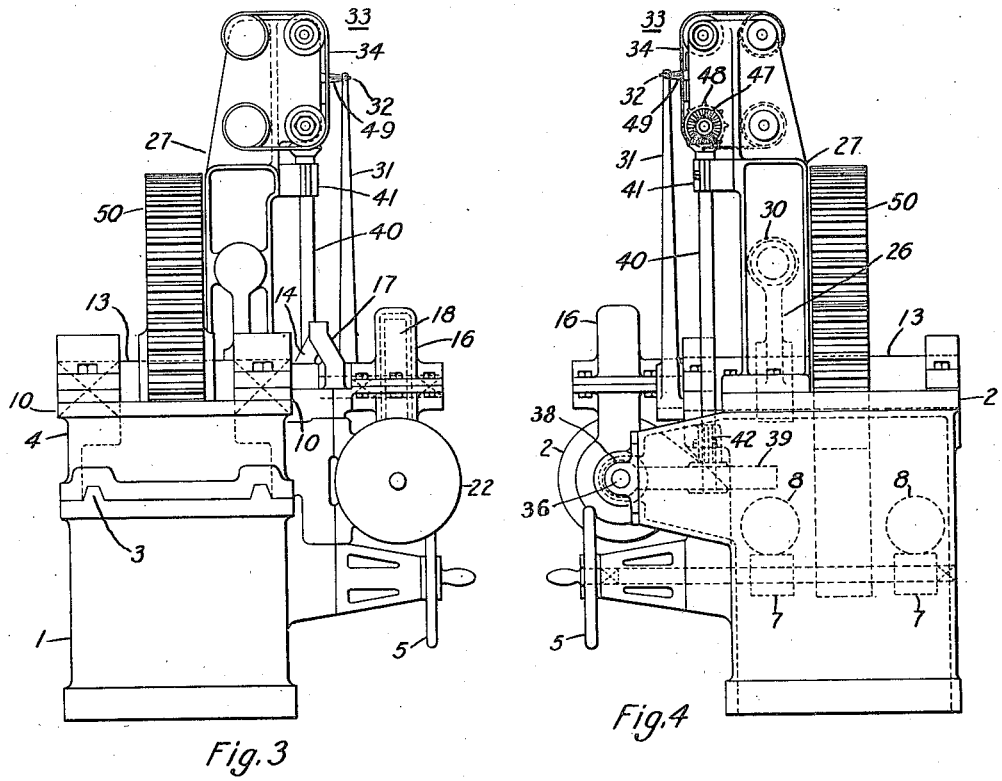
Figure 5:
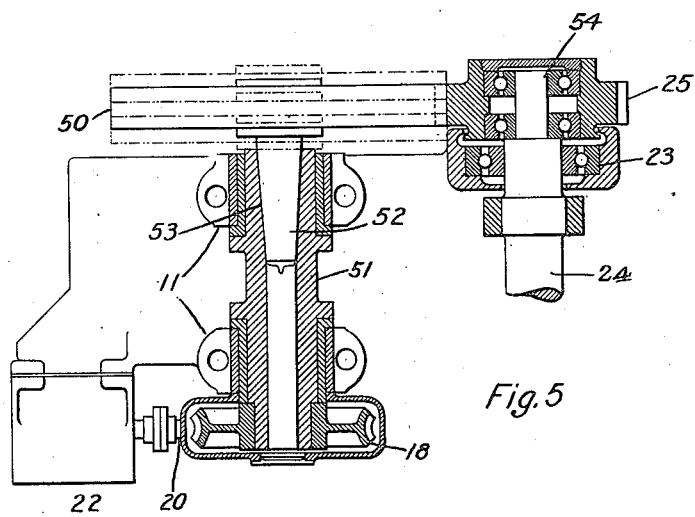

In the two sheets of the accompanying drawings, Figure 1 is a top plan view of a device embodying my invention; Fig. 2 is a side elevation thereof; Fig. 3 is a front view, in elevation, and Fig. 4 is a rear view, in elevation, of the device of Fig. 1, Fig. 4ª is a detail view, looking from the rear of Fig. 4, and Fig. 5 is a top plan view, partly in section, of a modification of certain parts of the device of Fig. 1.

A relatively long and narrow bed plate 1 is provided at one end with a raised integral portion 2 for a purpose to be hereinafter set forth.

The upper face of the bed plate 1 is provided with ways 3, substantially similar to ways such as are used on planers. A carriage 4 is mounted on the ways 3 and is arranged to be moved longitudinally on the bed plate 1 by means of a handwheel 5, which operates two lead screws 6, 6 by means of a worm 7 and worm gear 8 for each lead screw. The lead screws 6 co-operate with downwardly projecting portions 9 secured to the carriage 4, to move it longitudinally of the bed plate 1. Clamping means (not shown), similar to those used on lathe carriages, may be provided on the carriage 4 to clamp it to the bed plate 1 after the desired longitudinal location of the carriage 4 has been obtained.

The carriage 4 is provided with two bearing members 10, each bearing member being provided with a removable bearing cap 11 secured to the bearing 10 by means of bolts 12. A shaft 13 is rotatably mounted in the bearings 10 and is provided, at one end, with a driving arm 14 for a purpose to be hereinafter set forth.

A short shaft 15, axially aligned with the shaft 13, is mounted in a bearing housing 16 and is provided, at one end, with a driving arm 17 to co-operate with the driving arm 14 to rotate the shaft 13. A worm gear 18 is mounted on the shaft 15 and is driven by means of a worm 19 mounted on a shaft 20. The shaft 20, mounted in bearings 21, is suitably connected to a driving motor 22 which is secured to the carriage 4.

A plurality of bearing members 23 is provided in the raised portion 2, and a shaft 24 is mounted therein. The bearing members 23 comprise relatively large ball or roller bearings which shall have a minimum amount of friction and relatively small wear in continued use. As shown more clearly in Fig. 4ª, a central part of the shaft 24 is turned on a center eccentric to the axis of the bearings, as indicated in dotted lines in Fig. 2, and a master pinion 25 is rotatably mounted on a relatively large ball or roller bearing. This bearing is secured to the shaft 24 on the eccentric portion thereof, so that the axis of the pinion 25 lies in a plane above the axis of the shaft 24, and the pinion 25 may rock on the bearings 23, toward, and away from, a gear carried by the shaft 13, as such pinion encounters irregularities in the engaging surface of said gear. A lever arm 26 is rigidly secured to the shaft 24 in such angular relation thereto that, when the arm 26 is substantially vertical, the axis of the pinion 25 is in vertical alinement with the axis of the bearings 23.

A bracket 27 is mounted on the raised portion 2 and to one of its vertical surfaces 28 is suitably secured an adjustable bolt 29 and a helical spring 30. The arm 26 is enlarged and perforated at its upper end (Fig. 4), so that the shank of the bolt 29 may pass therethrough. Such enlarged portion is engaged on one side by the head of the bolt 29 to limit the rocking movement of the pinion 25 in a direction toward the shaft 23, and the spring 30 abuts against the other face of the enlarged portion of the arm 26 to resiliently restrain the shaft 24 from rotative movement in the other direction. A relatively long lever arm 31 is suitably secured to the shaft 24 at one end thereof and carries a marking device 32 for a purpose to be hereinafter set forth.

A recording device 33, mounted on the bracket 27, comprises a record sheet 34 which is advanced in accordance with the angular movement of the shaft 13 by the hereinafter described means. The shaft 20 is provided, at its outer end, with a relatively long sleeve 35 which is slidable on the shaft 20 but is rotatable therewith. At its other end, the sleeve 35 is secured to a short shaft 36 that is rotatably mounted in two bearings 37 which are secured to the side of the raised portion 2. A worm 38 is secured to the shaft 36 intermediate the bearings 37 and co-operates with a worm gear 39 which is secured to the lower end of a vertical shaft 40 rotatably mounted in suitable bearings 41 and 42. A bevel gear wheel 43 is mounted on the upper end of the shaft 40 and co-operates with a bevel gear 44 which is secured to a short shaft 45 mounted in a bearing 46 secured to the bracket 27. The shaft 45 carries a cylindrical member 47 which is provided with a plurality of radial projections 48 which register with openings 48ª along the edges of the record sheet 34 and operate to advance the sheet when the motor 22 is operated. A marking device 49 is rigidly secured to the bracket 27 and operates to mark a base line on the record sheet 34 as the same is advanced.

A gear wheel 50 to be tested is so mounted on the shaft 13 as to be rotatable therewith, the gear wheel 50 and the pinion 25 being, of course, provided with complementary teeth so that they may be operatively associated and driven in a manner to be hereinafter set forth.

Fig. 5 shows a modification of certain parts of the device embodying my invention, these parts being particularly the mounting of the gear wheel 50 to be tested and of the master pinion 25. A hollow shaft 51 is rotatably mounted in a plurality of bearings 11 and has secured thereto, at its outer end, the worm gear 18 which is driven by the worm 19 mounted on the shaft 20. The shaft 51 is formed, at the other end, with a frusto-conical opening 52 to provide a taper seat for a taper shaft 53 upon which the gear wheel 50 may be mounted. The master pinion 25 is mounted on an overhanging portion 54 of the shaft 24, the portion 54 being turned eccentric to the bearings 23 (only one of which is shown) in which the shaft 24 is mounted. It is to be understood that suitable changes are made in the bed plate 1, the carriage 4 and the bracket 27 so that all of the parts may co-operate properly. A suitable arrangement may be provided to cause a cross travel of the complete gear shaft mounting, so that a predetermined portion of the face of the test gear wheel may operatively engage the master pinion for a purpose to be hereinafter set forth. As this contemplates the use of elements which are standard in machine tools, it is not shown or further described here.

A scale 55 is secured to the bed plate 1, and a vernier scale 56 is suitably secured to the carriage 4 so that the gear-center distance between the axis of the shaft 13 and of the shaft 24 may be accurately determined.

Before the device may be employed to test the accuracy of a gear wheel, the following adjustment and test run must be made. The bolt 29 is so adjusted that the record pencil 32 in the arm 31 will be near, and within the edge of, the record sheet 34. The angular relation of the arm 26 to the shaft 24 must be such that the axis of the master pinion 25 is in vertical alinement with the axis of the shaft 24 in its bearings, as shown in Fig. 4ª, when the recording pencil 32 is in the middle of its path of travel on the record sheet 34. The master pinion 25 is preferably case-hardened and accurately ground to finished dimensions. A second master pinion (not shown) provided with a number of teeth, which is prime to the number of teeth on the first master pinion or, as usually expressed, having a hunting-tooth ratio with the first master pinion, is mounted on the shaft 13 or the shaft 53. The carriage 4 is then so moved by means of the hand wheel 5 that the second master pinion mounted on the shaft 13 or 53 is brought into tight mesh with the master pinion 25 and such pressure is effected between engaging portions of the two pinions that the pinion 25 is rocked on its pivotal mounting in the bearings 23, and the pencil 32 in the lever arm 31 is in substantially the middle of the record sheet 34, after which the carriage 4 may be tightly locked in place. The motor 22 may now be energized to drive the second master pinion on the shaft 13 in a clockwise direction a sufficient number of revolutions to cause any one tooth in it to come in contact with every tooth in the first master pinion, the record pencil 32 drawing a curve on the record sheet 34 indicating the variations in the location of the axis of the master pinion 25 with respect to the axis of the pinion on the shaft 13. The marking device 49 will, at the same time, draw a base line on the record sheet for reference purposes.

The two master pinions may be provided with suitable tool or record numbers which may be noted on a part of the record blank reserved for such purposes, together with other pertinent information, after which the curve may be filed as a standard of accuracy for the particular master pinion 25 when used with the testing machine. A similar set of master pinions will be made for each diametral pitch and style of tooth which are to be tested by means of the device embodying my invention, and test curves will be run on each pair and filed for future reference. These curves will not only furnish original standards of accuracy for the device but will also permit of being used as standards for later runs with the same pinions on the device to check the device for possible errors due to wear or incorrect setting of its parts.

The method of using the device embodying my invention is as follows: A suitable master pinion 25 is mounted on the shaft 24, and a gear wheel 50 to be tested is mounted on the shaft 13 which is then placed in its bearings 10. The carriage 4 is then so moved as to cause the teeth of the gear wheel 50 to engage the teeth of the master pinion 25 with a pressure between the engaging portions of such value that the recording pencil 32 will be substantially in the middle of the record blank. The carriage 4 is then securely clamped in position on the bed plate 1. A mark is then made on the gear wheel 50 at a point just below the tooth which is centrally in mesh with the teeth on the master pinion and a reading is taken of the gear-center distance between the test gear wheel and the master pinion. This gear-center distance is recorded on the record blank, together with other data which will identify the master pinion as well as the gear wheel for future reference.

It may also be desirable to record the tool numbers of all mandrels, fixtures and cutters which were used in the manufacture of the particular gear wheel so that a complete history of the manufacture of the gear wheel may be found on the record blank that indicates its performance in the gear-testing machine. The motor 22 is then started and drives the gear wheel very slowly one complete revolution in a clockwise direction, the record sheet 34 being advanced, in accordance with the rotation of the gear wheel 50, by means of its train of shafts and gear wheels. The master pinion 25 is resiliently restrained in tight mesh with the gear wheel 50 but may move on its pivotal support in the bearing 23 while rotating on its bearing on the shaft 24. Should there be a high or a thick tooth on the gear wheel 50, the master pinion 25 will be moved away from the gear wheel 50 and thus cause the shaft 24 to have a slight rotative movement in a clockwise direction. The record pencil 32 will also be moved and will trace a small curve of substantially V-shape away from the main curve. If one or two of the teeth on the gear wheel 50 are cut too deep or too thin, the master pinion will be moved toward the gear wheel 50 and the record pencil 32 will trace a small V-curve to the other side of the main curve.

If the gear wheel has been so cut that the pitch circle is eccentric, the record pencil 32 will trace a curve which travels from one side of the sheet toward the other side and then back again to substantially the same longitudinal position on the record sheet, as the test gear wheel is given one complete revolution. In the case of a gear wheel having an integral rim hub and arms, there is a possibility that the pitch line of the teeth may not be a circle because of the unequal expansion and contraction of the rim and the arms, in which case, the record pencil will trace a series of undulatory curves, having a number of nodes equal to the number of arms in the gear wheel.

In the case of gear wheel having a relatively wide face, the pitch-circle diameter at one edge of the face may be different than that at the other edge, because of the method of lowering the gear wheel into the quenching bath. To determine this, the gear wheel may be tested with only a narrow portion at one edge of its face in engagement with the master pinion and then tested again with a narrow portion at the other edge of its face in engagement with the master pinion. A comparison of the initial gear center distances in the two runs, and of the curves obtained in each run, will show the amount, if any, of such difference.

The device embodying my invention will not only test the gear wheels for inherent variations from a standard but will also act as a check upon the tools and fixtures used in the manufacture of the gear wheels.

If a number of similar gear wheels are to be manufactured, it is probable that only a small portion of that number will be associated with a certain set of tools and fixtures during the process of manufacture. The test curves of this portion of the gear wheels may show the same general characteristics and may be different from the curves obtained from the tests on the other groups of gear wheels. A detailed study and comparison of the individual curves of one group and of the other groups will show what variations from a standard are inherent in the gear wheel itself and what variations are caused by defective or worn tools and fixtures. In this way, the search for the cause of imperfections in the finished gear wheels is narrowed down and the cause may be more easily and quickly located than would otherwise be possible.

After the gear wheels are tested, the curves obtained on the tests may be filed for future reference and may be used to determine what variations from a standard are allowable in a gear wheel, without exceeding the limit which would result in poor operation in actual service. Reports on the operating characteristics and troubles of the various gear wheels in service may be obtained and checked against test curves, and, in a relatively short time, the limits of variation from a standard, within which limits it is necessary to hold the work to obtain satisfactory commercial operation, may be determined. The effects of actual operation on the gear wheels may also be determined by testing the gear wheels from time to time and checking the test results against the amount and kind of service to which they were subjected.

The device embodying my invention thus makes it possible to test each individual finished gear wheel for variations from a standard and to make an enlarged permanent record of such variations on a record sheet, to record other pertinent information regarding the course of manufacture of the gear wheel thereon and to file the complete record sheet for future reference.

The trained skill of an observer will no longer be necessary to determine if the variations in a gear wheel are within the allowable limits of error but the gear wheel itself will be caused to trace a permanent record of its variations from a standard which record will always be available for reference. The device will furnish its own standard of accuracy and may be retested at any time to determine if its accuracy has been impaired by reason of the wear of any of its parts.

Various modifications may be made in the device without departing from the spirit and scope of my invention and I desire that only such limitations shall be placed thereon as are imposed by the prior art or are specifically set forth in the appended claims.

I claim as my invention:

1. In a gear-wheel testing machine, the combination with a driven shaft, and means for driving said shaft, of a second shaft, bearings for said shaft, a master pinion rotatably mounted on said second shaft on a center eccentric to that of the shaft in its bearings, resilient means for holding said pinion in tight mesh with a gear wheel to be tested, mounted on said driven shaft and rotating therewith, said resilient means permitting relatively small rotative movements only of said shaft in its bearings, a record sheet advanced in accordance with the rotation of the driven shaft, a lever arm secured to said second shaft and a marking device mounted on said lever arm and co-operating with said record sheet to make a permanent enlarged record of the variations in the distance between the centers of the driven shaft and the pinion as said driven shaft is rotated.

2. In a testing machine, the combination with a shaft, bearings for said shaft, resilient means for limiting the rotative movement of said shaft to a relatively small amount and a master pinion rotatively mounted on said shaft on a center eccentric to that of the shaft in its bearings, of a rotatable second shaft, driving means for said second shaft, means for moving said second shaft and a gear wheel to be tested mounted thereon to secure tight mesh of said gear wheel and said master pinion, means for measuring the distance between the centers of said second shaft and said master pinion, a record sheet, means for advancing said record sheet in accordance with the rotation of said second shaft, a lever arm secured to said first shaft and movable therewith, and a marking device on said lever arm co-operating with said record sheet to make an enlarged permanent record of the variations in the distance between the centers of said second shaft and said master pinion, as said gear wheel is rotated.

3. In a gear-wheel-testing machine, the combination with a shaft, bearings for said shaft, resilient means for limiting the rotative movement of said shaft to a relatively small amount, and a master pinion rotatively mounted on said shaft on a center eccentric to said bearings, of a rotatable second shaft carrying a gear wheel to be tested, driving means for said second shaft, means for so moving said second shaft to effect operative engagement of said gear wheel and said pinion and to effect a predetermined pressure between engaging portions of said gear wheel and said master pinion, means for measuring the initial distance between the centers of said gear wheel and said master pinion, a record sheet, means actuated by said driving means for advancing said record sheet in accordance with the rotation of said second shaft, and a marking device actuated by said first shaft co-operating with said record sheet to make a permanent enlarged record of the variations in the pressure between said gear wheel and said master pinion as said second shaft and gear wheel are rotated.

4. The method of testing gear wheels which comprises mounting a master pinion on a resiliently restrained, and pivotally supported bearing member, causing said gear wheel to engage said master pinion with a predetermined pressure between engaging portions thereof, slowly rotating said gear wheel and said master pinion and advancing a record sheet in accordance with the rotation of said gear wheel, and causing a permanent enlarged record to be made on said record sheet of the variations of the location of the axis of said master pinion relative to its bearing member as said gear wheel is rotated.

5. A gear wheel testing machine comprising a shaft journaled in the machine base, a crank shaft parallel therewith journaled in said base, means for mounting the gear wheel to be tested on said first named shaft, a master gear wheel rotatably mounted on the crank of said other shaft, a lever secured on the end of said crank shaft and a recording device associated with said lever.

6. A gear wheel testing machine comprising a shaft journaled in the machine base, a crank shaft parallel therewith journaled in said base, means for mounting the gear wheel to be tested on said first named shaft, a master gear wheel rotatably mounted on the crank of said other shaft, resilient means for restraining rotative movement of said crank shaft, a lever secured on the end of said crank shaft and a recording device associated with said lever.

7. A gear wheel testing machine comprising a shaft journaled in the machine base, a crank shaft parallel therewith journaled in said base, means for mounting the gear wheel to be tested on said first named shaft, a master gear wheel rotatably mounted on the crank of said other shaft, resilient means for restraining rotative movement of said crank shaft, a lever secured on the end of said crank shaft, a recording device associated with said lever, and means for recording angular displacement of said crank.

8. A gear wheel testing machine comprising a shaft journaled in the machine base, a crank shaft parallel therewith journaled in said base, means for mounting the gear wheel to be tested on said first named shaft, a master gear wheel rotatably mounted on the crank of said other shaft, means for rotating said gear wheels on their respective shafts, resilient means for restraining rotative movement of said crank shaft and means for recording angular displacement of said crank.

9. A gear wheel testing machine comprising a pivotally and eccentrically mounted master gear wheel in tight mesh with a gear wheel to be tested, means for effecting rotative movement and angular displacement of said master wheel and means for recording the latter.

10. A gear wheel testing machine comprising a pivotally and eccentrically mounted master gear wheel, resilient means for tightly meshing a gear wheel to be tested with said master wheel, means for effecting rotative movement and angular displacement of said master wheel and means for recording the latter.

In testimony whereof, I have hereunto subscribed my name this 5th day of January, 1920.

GEORGE M. EATON.